(No Model.)

D. C. GILLILAND.
MARKER FOR CORN AND SEED PLANTERS.

No. 353,215. Patented Nov. 23, 1886.

UNITED STATES PATENT OFFICE.

DANIEL C. GILLILAND, OF MECHANICSVILLE, IOWA.

MARKER FOR CORN AND SEED PLANTERS.

SPECIFICATION forming part of Letters Patent No. 353,215, dated November 23, 1886.

Application filed July 26, 1886. Serial No. 209,065. (No model.)

*To all whom it may concern:*

Be it known that I, DANIEL C. GILLILAND, a citizen of the United States, residing at Mechanicsville, in the county of Cedar and State of Iowa, have invented certain new and useful Improvements in Markers for Corn and Seed Planters; and I do hereby declare that the following is a full, clear, and exact description of the invention, which will enable others skilled in the art to which it appertains to make and use the same.

My invention relates to improvements in markers for corn and seed planters, the object of the invention being to provide improved means for shifting the marker when the planter has reached the end of a row and is turned, and to provide means for the purpose mentioned which shall be simple in their construction, strong and durable, and easily operated.

The invention consists in the improved construction and combinations of parts, hereinafter fully described, and pointed out in the claim.

Figure 1:
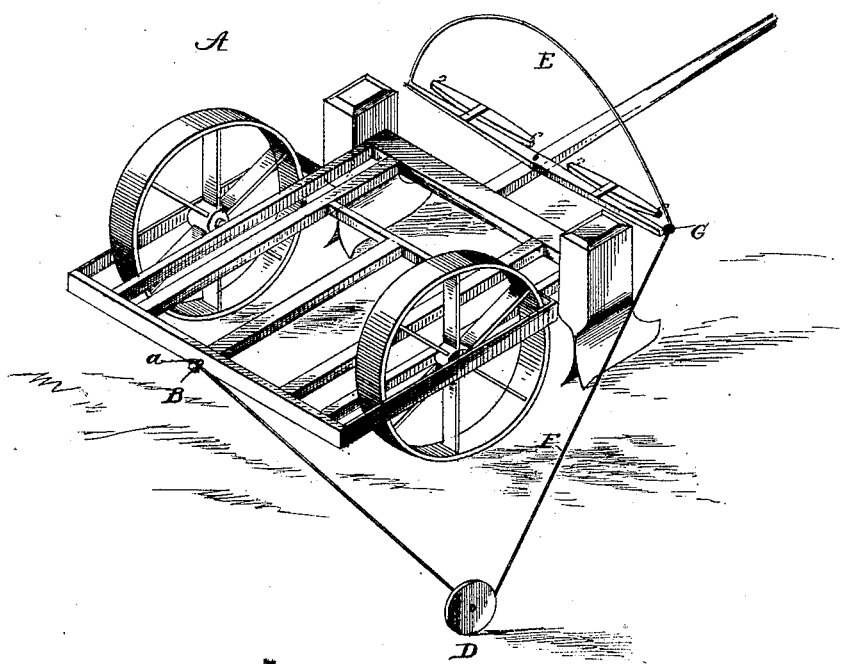
Figure 2:
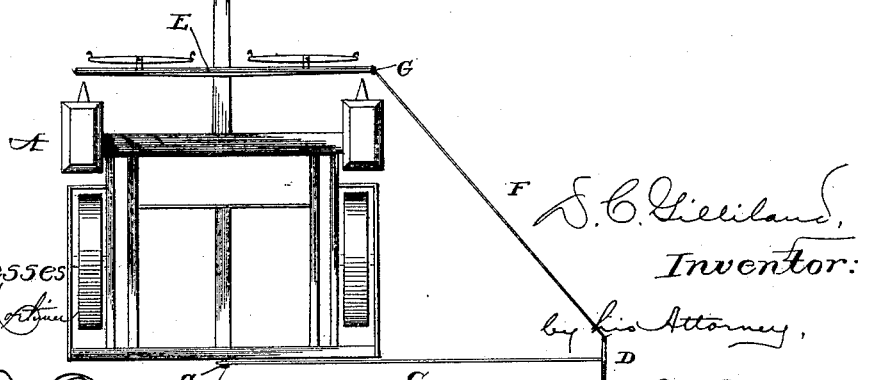

In the drawings, Figure 1 is a perspective view of a corn-planter with my improvements applied, and Fig. 2 is a plan view.

Corresponding parts in both the figures are denoted by the same letters of reference.

Referring to the drawings, A represents the planter of any ordinary or well-known construction.

Projecting from the rear end of the corn-planter, about midway its sides, is a bolt, B, on which is pivotally mounted a bar, C, which extends laterally a considerable distance beyond the side of the planter, said bar being retained in position upon the bolt by means of a nut, *a*. Upon the outer end of the bar C is mounted a marker, D, which may consist of a circular disk, as shown.

E represents an arc shaped or curved metal bar, which is attached to the whiffletree of the planter, or at any other suitable point at the front end of the frame of the latter.

F represents a rope or chain, which is secured to the marker D at one end. This rope or chain is provided at its other end with a ring, G, which is mounted, and is adapted to slide upon the arc-shaped or curved metal bar E.

The operation of my invention is obvious. When the end of a row has been reached and the planter is turned, the marker is shifted by moving it on its pivot to the opposite side of the planter without dismounting, the rope or chain connecting it with the curved metal bar serving as a brace and holding it in proper position.

My invention is simple in its construction, may be manufactured and supplied at a slight cost, is strong and durable, effective in its operation, and may be readily and easily applied to planters now in common use.

Having thus described my invention, what I claim is—

In a marker for corn-planters, the combination, with the whiffletree, of an arc-shaped metal bar attached thereto, a bolt projecting from the rear end of the planter, a bar pivotally mounted thereon and carrying a marker at its outer end, and a rope secured to the marker and adapted to slide on the arc-shaped bar E, substantially as set forth.

In testimony whereof I affix my signature in presence of two witnesses.

DANIEL C. GILLILAND.

Witnesses:
 S. D. LEE,
 CHAS. E. BATDORF.